US008479093B2

(12) United States Patent  (10) Patent No.: US 8,479,093 B2
Ravindran et al.  (45) Date of Patent: Jul. 2, 2013

(54) METAMODEL-BASED AUTOMATIC REPORT GENERATION

(75) Inventors: Karthik Ravindran, Bellevue, WA (US); Manoj Nuthakki, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1299 days.

(21) Appl. No.: 11/713,068

(22) Filed: Mar. 1, 2007

(65) Prior Publication Data

US 2008/0215621 A1  Sep. 4, 2008

(51) Int. Cl.
G06F 17/21 (2006.01)
G06F 17/24 (2006.01)
G06F 17/25 (2006.01)

(52) U.S. Cl.
USPC .......................................... 715/255; 715/222

(58) Field of Classification Search
USPC .................................. 715/255, 222
See application file for complete search history.

(56) References Cited

U.S. PATENT DOCUMENTS

| | | | |
|---|---|---|---|
| 6,233,583 B1 | 5/2001 | Hoth | 707/102 |
| 6,360,246 B1 | 3/2002 | Begley et al. | 709/203 |
| 6,996,781 B1* | 2/2006 | Myers et al. | 715/763 |
| 7,031,979 B2 | 4/2006 | Kauffman | 707/104.1 |
| 7,111,007 B2 | 9/2006 | Their et al. | 707/100 |
| 7,584,420 B2* | 9/2009 | Gaug et al. | 715/234 |
| 7,610,575 B2* | 10/2009 | Sproule | 717/103 |
| 7,788,647 B2* | 8/2010 | Martin et al. | 717/135 |
| 7,836,398 B2* | 11/2010 | Hirai | 715/243 |
| 7,949,953 B2* | 5/2011 | Bhatt et al. | 715/771 |
| 8,341,518 B2* | 12/2012 | Hirai | 715/243 |
| 2002/0099717 A1* | 7/2002 | Bennett | 707/102 |
| 2004/0006741 A1* | 1/2004 | Radja et al. | 715/513 |
| 2004/0133876 A1* | 7/2004 | Sproule | 717/105 |
| 2004/0252134 A1 | 12/2004 | Bhatt et al. | 345/619 |
| 2004/0268240 A1* | 12/2004 | Vincent, III | 715/513 |
| 2006/0004842 A1 | 1/2006 | Wu et al. | 707/102 |
| 2006/0116859 A1 | 6/2006 | Legault et al. | 703/22 |
| 2006/0168560 A1 | 7/2006 | Pandey | 717/106 |
| 2007/0179975 A1* | 8/2007 | Teh et al. | 707/104.1 |
| 2007/0226643 A1* | 9/2007 | Pagan | 715/780 |
| 2010/0076809 A1* | 3/2010 | Eryurek et al. | 705/9 |
| 2010/0106546 A1* | 4/2010 | Sproule | 705/7 |
| 2011/0029906 A1* | 2/2011 | Hirai | 715/765 |

OTHER PUBLICATIONS

CORDA Technologies, Inc., Reporting Tool; http://www.corda.com/1page/reporting_tool.html (2006).

(Continued)

*Primary Examiner* — Doug Hutton
*Assistant Examiner* — Soumya Dasgupta
(74) *Attorney, Agent, or Firm* — Joseph R. Kelly; Westman, Champlin & Kelly, P.A.

(57) ABSTRACT

A metamodel-based system for automatically generating reports is provided. Much of the work involved in creating report designs and reports is automated, allowing developers to produce a broad variety of report designs and reports in a fraction of the time required with standard report development, according to one illustrative embodiment. Metamodels for data and style templates may be created, that allow for the automated design and manipulation of report models. The report models may be used to generate reports that include the indicated data, arranged according to indicated data field properties, settings, and style templates. Changes made in the metamodels can automatically be reflected in reports designed according to those metamodels.

18 Claims, 9 Drawing Sheets

OTHER PUBLICATIONS

JasperReports; http://www.jasperforge.org/sf/projects/jasperreports (2006).

Synaptris—IntelliVIEW; http://www.synaptris.com/products/reporting-analytics/index.html (2007).

Reporting tool for Oracle ERP; http://www.aspstreet.com/rfp/view.taf/e,3920 (2002).

Dstar; http://www.taborcommunications.com/dsstar/00/0912/102163.html (2000).

\* cited by examiner

METAMODEL-BASED AUTOMATIC REPORT GENERATION

BACKGROUND

Reports are widely used in business applications to analyze and share data. Reports that are pre-packaged with a business application are commonly referred to as production reports. Production reports are typically created by business application developers, and are used to create views of the application data that are useful to and can be shared across multiple users. Users can access production reports via menus and contextual links surfaced in a business application. Production reports in business applications range from being simple list and tabular renderings of data to richer visualizations that include charts, cross-tabs, and composite renderings.

Developers often use report designing tools to build and integrate production reports in business applications. These report designing tools are applied by developers to datasets to retrieve report data, and visually define report layouts, such as by dragging/dropping and moving data fields around, to achieve the desired presentation. A typical Enterprise Resource Planning (ERP) business application tends to have around 800 to 1,000 pre-packaged production reports. The developer effort required to create the designs for all production reports from scratch using a report designing tool is a significant investment; hundreds of worker-hours of skilled labor are commonly invested in designing and integrating production reports in an ERP business application.

The discussion above is merely provided for general background information and is not intended to be used as an aid in determining the scope of the claimed subject matter.

SUMMARY

A metamodel-based system has been developed for automatically generating reports, that automate much of the work involved in creating report designs and reports, and allow developers to produce a broad variety of report designs and reports in a fraction of the time required with standard report development, according to one illustrative embodiment. Metamodels for data and style templates may be created, that allow for the automated design and manipulation of report models. The report models may be used to generate reports that include the indicated data, arranged according to indicated data field properties, settings, and style templates. Changes made in the metamodels can automatically be reflected in reports designed according to those metamodels.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
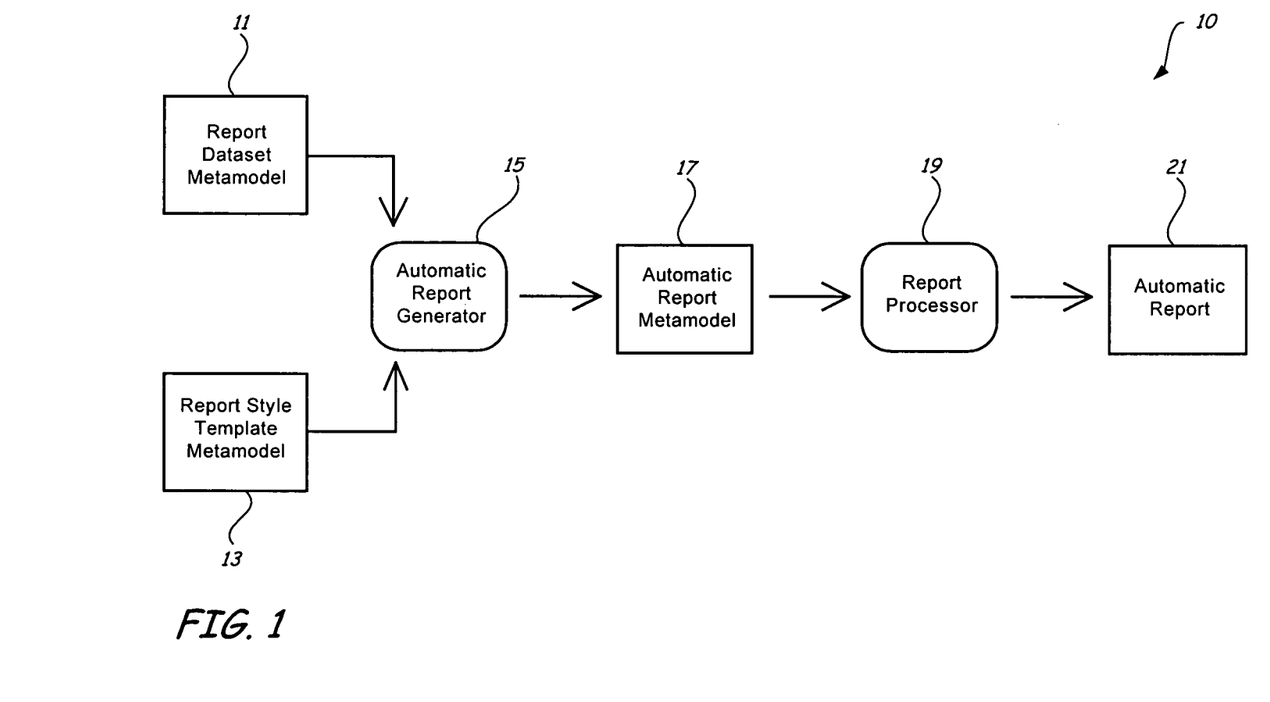
FIG. 1 depicts a schematic for a metamodel-based automatic report generating system, according to an illustrative embodiment.

FIG. 1 depicts a schematic representation of a metamodel-based automatic reporting system 10 for a computing system that enables a method for metamodel-based automatic reporting, according to an illustrative embodiment. Metamodel-based automatic reporting system 10 may be illustrative of embodiments that include computing systems, and executable instructions configured to be executable by computing systems, and contexts that enable method embodiments, for example. The following discussion provides further details of various illustrative embodiments. While certain illustrative arrangements, labels, screenshots, and samples of text being compared by a computer-implemented method, are included in this and the subsequent figures, they are intended as illustrative and indicative of the variety and broader meaning provided in the discussion and claims herein. A variety of illustrative features and implementations are described herein that help illustrate the inventive subject matter, although that subject matter is broader than can be described herein in complete detail; none of the particular illustrative embodiments or details thereof as described below define limits that exclude other embodiments, aspects, and variations.

Automatic reporting system 10 includes report dataset metamodel 11 and report style template metamodel 13, according to one illustrative embodiment. Report dataset metamodel 11 and report style template metamodel 13 may both contribute to automatic report generator 15, which uses them to generate automatic report metamodel 17. Automatic report generator 15 therefore provides automatic report metamodel 17 as an abstract metamodel that defines report definitions and the styling that needs to be applied when the reports are rendered.

In one illustrative embodiment, the automatic report metamodel 17 constitutes an abstract definition of a report. Automatic report metamodel 17 may be independent of specific physical implementations and media of any one particular report writing application. Automatic report metamodel 17 may therefore apply seamlessly across different report writer tools, and be realized in different physical representations, depending on specific requirements.

Automatic report metamodel 17 may then be processed and rendered by report processor 19 to generate the design of automatic report 21. Automatic reporting system 10 may operate either in design time or in run time. In design time, automatic report metamodel 17 may be processed and rendered into a report design, which is a physical report definition schema; while in run time, automatic report metamodel 17 may be processed and rendered into a finished report. Automatic report metamodel 17 may be translated directly into an end-product report design or report, or translated into any of a variety of report definition language schemas. This may include translation into a schema for any of a variety of other report-writing tools, which may then serve as end-stage components in processing a report design, before producing a finished automatic report 21. Automatic report 21 may include a design time report design, or a run time finished report, for example. Other embodiments are not limited to the details listed here or to all the steps listed here, and may include other variations on generating automatic report metamodel 17, for example.

Automatic reporting system 10 may provide automatic report generator 15 with the capability for automatically generating visually rendered production reports 21, from the definitions of the datasets of report dataset metamodel 11 that provide the source of the report data. This may include visually rendering production reports that are graphic-intensive or otherwise include formatting and visuals beyond the format of a plain-text document, which is often true of the large majority of production reports in an enterprise application. The automatically generated production reports 21 may include lists, tabular renderings, charts, cross-tabs, composite renderings, drill-down and drill-up menus, and a variety of user-interactive features, for example, along with a variety of other layouts and formats. The automatically generated production reports 21 may also provide various other rich visual presentations, styles, and advanced layouts, and are not limited to any of the specific illustrative examples provided herein. Additional illustrative examples of aspects of automatic reporting system 10 are also further depicted and described with reference to the subsequent figures. In the illustrative embodiment of FIG. 1, automatic reporting system 10 therefore provides a feature-rich automatic production reporting framework, which enables a significant boost in developer productivity in designing and integrating production reports in a business application.

Figure 2:
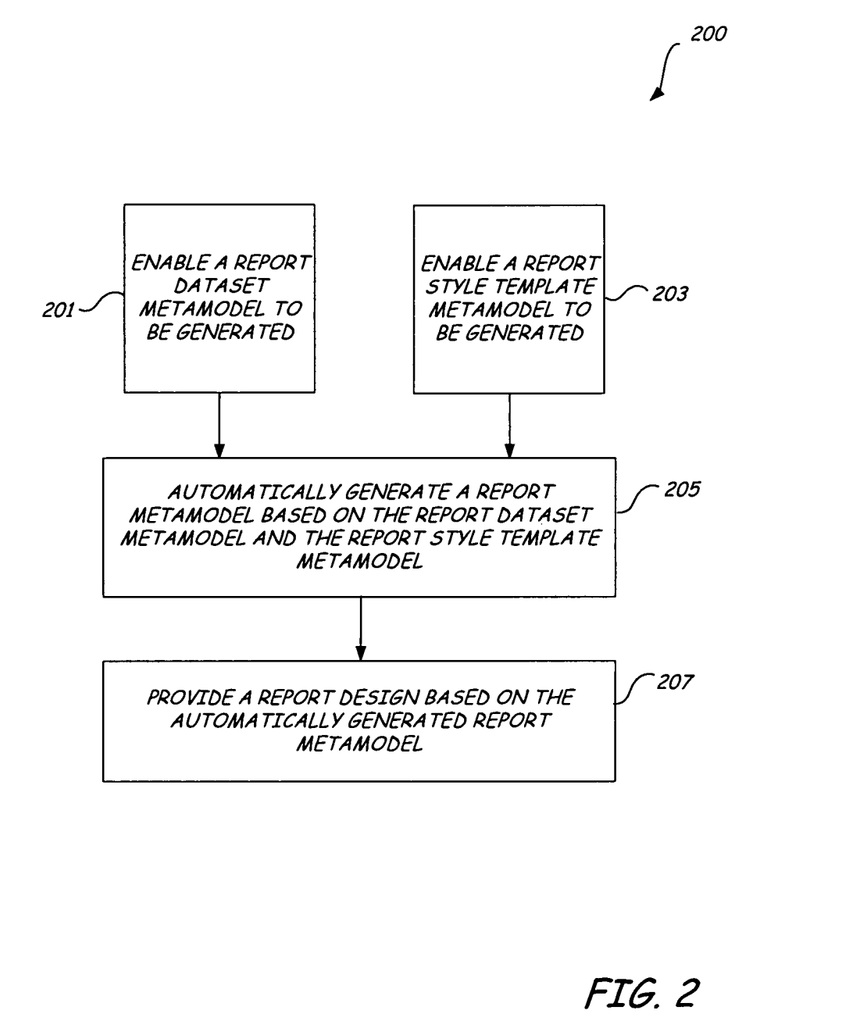
FIG. 2 depicts a flowchart of a method for automatically generating reports, according to an illustrative embodiment.

FIG. 2 provides a flowchart for an exemplary embodiment of a metamodel-based automatic report generating method 200, according to an illustrative embodiment. Method 200 includes step 201, of enabling a report dataset metamodel to be generated; step 203, of enabling a report style template metamodel to be generated; step 205, of automatically generating a report metamodel based on the report dataset metamodel and the report style template metamodel; and step 207, of providing a report design based on the automatically generated report metamodel, in this illustrative embodiment. Other embodiments may include other steps, orderings, or combinations of steps, for example.

Report dataset metamodel 11 of FIG. 1 may contribute to enabling a report dataset metamodel to be generated, as in step 201, in one illustrative embodiment. Analogously, report style template metamodel 13 of FIG. 1 may contribute to enabling a report style template metamodel to be generated, as in step 203, in this illustrative embodiment. Automatic report generator 15 may contribute to automatically generating a report metamodel based on the report dataset metamodel and the report style template metamodel, as in step 205, such that automatic report metamodel 17 of FIG. 1 may constitute the report metamodel thereby automatically generated. Report processor 19 of FIG. 1 may contribute to providing a report design, such as automatic report 21 of FIG. 1, based on the automatically generated report metamodel, as in step 207, in this illustrative embodiment. Method 200 is not limited to these details, and may also be used with a broad variety of other metamodels and other components.

Figure 3:
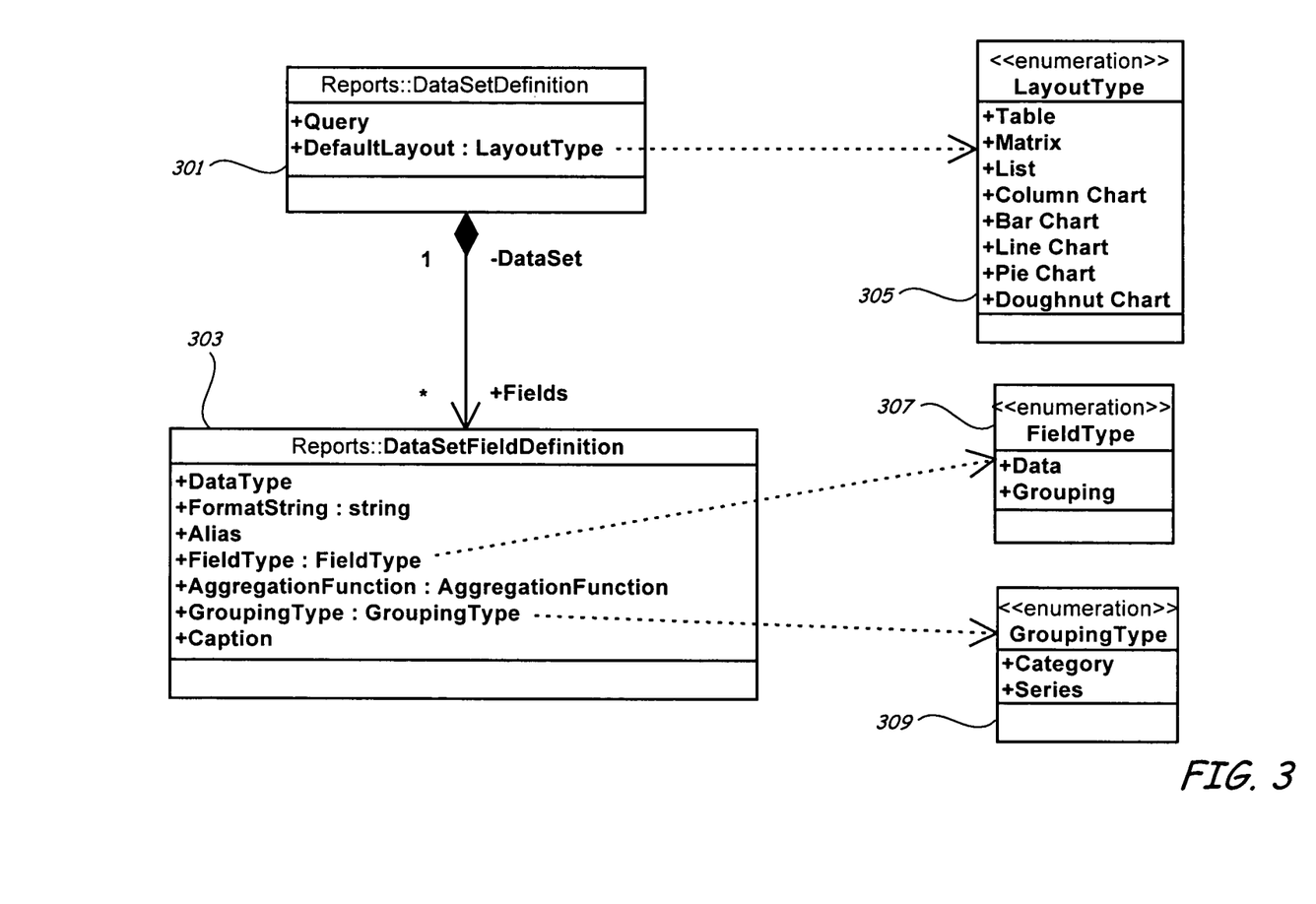
FIG. 3 depicts a class diagram of a report dataset metamodel for automatic report generation, according to an illustrative embodiment.

FIG. 3 depicts a report dataset metamodel 301 for automatic report generation, represented in a modeling class diagram, depicting the properties of and relationships among the components of report dataset metamodel 301. Report dataset metamodel 301 may be analogous to report dataset metamodel 101 of FIG. 1, though it is not limited to the aspects described for report dataset metamodel 101. Report dataset metamodel 301 provides one illustrative type abstraction that models a logical view of a report query data result set, illustratively such as a query made in a relational database management system, though report dataset metamodel 301 is independent of how a query is implemented. Such report queries may illustratively be implemented as modeled queries, native database queries, native database stored procedures, or imperative application business logic, for example, and are not limited to these specific examples, but may also include a broad variety of additional implementations.

As shown, report dataset metamodel 301 includes properties for a query and for a default layout. The default layout property may be assigned any of a variety of optional layout types 305, which illustratively includes layout options for a table, matrix, list, column chart, bar chart, line chart, pie chart, and doughnut chart layouts. The layout options are not limited to these illustrative examples, and may include a broad variety of additional layouts.

The report dataset metamodel 301 may comprise any number of report data fields 303, as indicated by the class diagram: the solid diamond at the root of the association line from report dataset metamodel 301 to report data fields 303 indicates an object composition relationship, while the number "1" and asterisk "*" arrayed alongside the relationship line indicate that one report dataset metamodel 301 may contain zero or more report data fields 303, in this illustrative embodiment. In turn, each report data field 303 may have any number of properties, such as those illustratively listed in report data field 303, and each of the properties may have any of various property setting options associated with them.

Report data fields 303 may illustratively include data fields for names; account numbers; contact information, such as phone numbers, email addresses, postal addresses, and so forth; and locations, which may include nation, state, province, city, or other unit of location; and any of which might apply, for example, to customers, partners, suppliers, service providers, or any other type of entities. Data fields may also be directed to units of time, such as years, months, days, and so forth; types of transactions; values of transactions; and any other type of data that may be associated with a data field, and which are not limited to those illustrative examples provided here. Each data field may have any of a variety of properties, such as data type, format string, alias, field type, aggregation function, grouping type, and caption field properties, as illustratively listed in report data field 303 in FIG. 3.

A broad variety of other field properties may also be used that are not limited to the specific examples provided here. As an illustrative example of a few different property setting options associated with some of these properties, the field type property may be associated with field type setting options 307, illustratively including data and grouping setting options; and the grouping type property may include a variety of illustrative grouping type setting options 309, including category and series setting options, among varied other potential property setting options beyond those depicted here.

A user may thereby select property option settings that may be used, in an illustrative embodiment, by the automatic report generator 15 of FIG. 1 to prescriptively generate definitions for automatic report metamodel 17, to organize data returned by resolving report dataset queries associated with report dataset metamodel 11 and render the data ultimately in automatic report 21. With a few simple property settings, a user can automatically generate compelling production quality automatic reports 21 directly from query definitions without having to design report layouts from scratch with a traditional, what-you-see-is-what-you-get (WYSIWYG) report designer tool or application.

In an illustrative sample scenario, a user may define a report dataset metamodel for a customer sales summary, by writing a Transact-SQL (TSQL) query against a sales database to retrieve sales summary data by customer group and year. In this illustrative embodiment, the query may return a dataset that may illustratively include fields for customer group, year, and sales. Other datasets are not limited to these examples and may include a broad variety of other fields. The user may define automatic reporting property settings for the report dataset fields, illustratively such as in Table 1 as follows:

TABLE 1

| Field | Property | Setting |
|---|---|---|
| Customer Group | FieldType | Grouping |
| | GroupingType | Category |
| Year | FieldType | Grouping |
| | GroupingType | Series |
| Sales | FieldType | Data |
| | AggregationFunction | Sum |
| | FormatString | Currency |

This report dataset metamodel therefore includes at least three fields in this illustrative embodiment, for customer group, year, and sales. The customer group field includes at least two properties in this embodiment: a field type property set to an option for grouping, and a grouping type property set to an option for category. The year field includes at least two properties in this embodiment: a field type property set to an option for grouping, and a grouping type property set to an option for series. Meanwhile, the sales field includes at least three properties in this embodiment: a field type property set to an option for data, an aggregation function property set to an option for sum, and a format string property set to an option for currency. These selections for data fields, properties, and property settings, for a report dataset metamodel, provide the basis for enabling a robust automatic report metamodel to be automatically generated.

Figure 4:
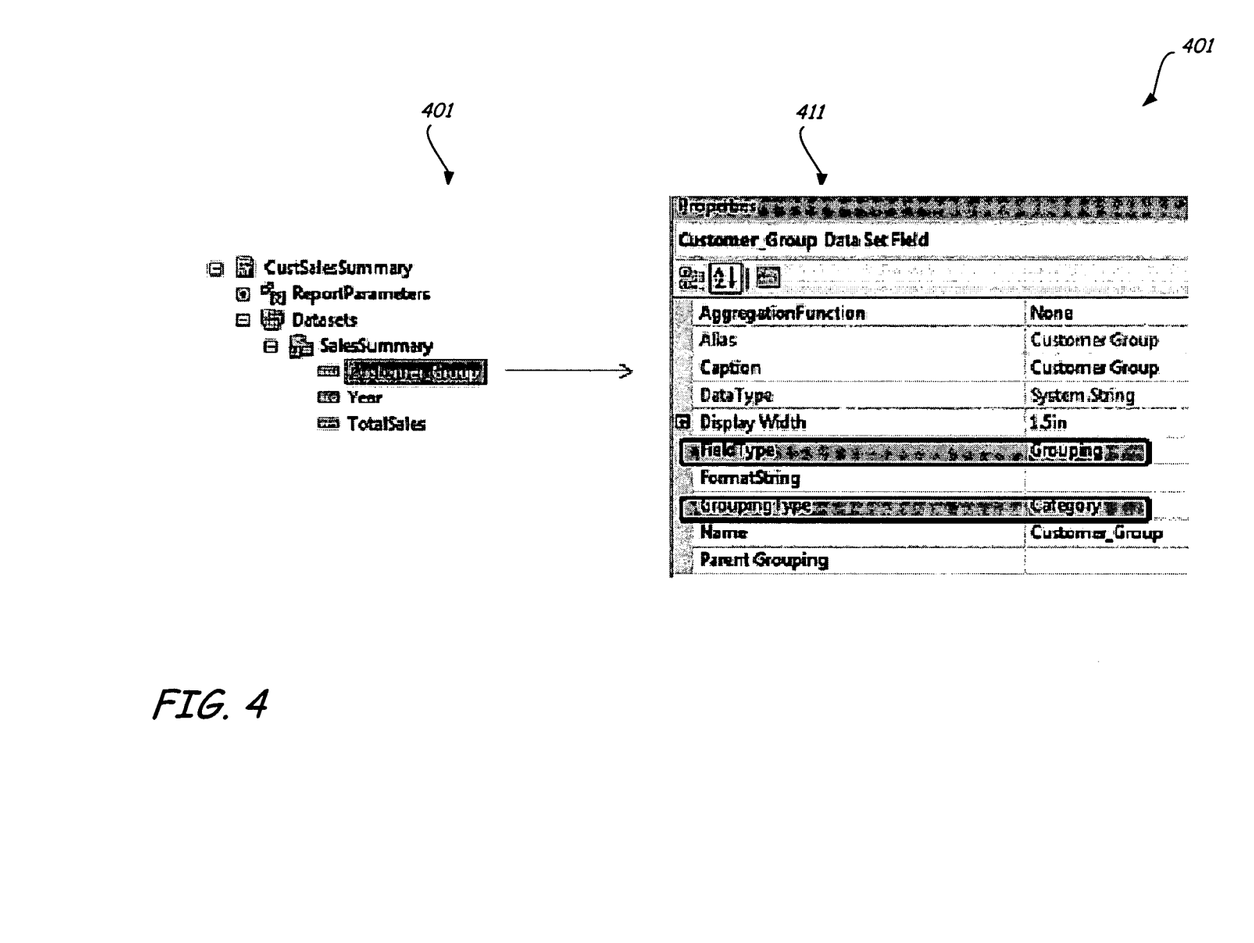
FIG. 4 depicts a screenshot of an implementation of a metamodel-based automatic report generation system, according to an illustrative embodiment.

FIG. 4 depicts a screenshot 400 illustrating the elements of the customer sales summary report dataset metamodel 401, in an integrated development environment (IDE). In this particular screenshot, the customer group dataset field is selected in the representation of report dataset metamodel 401, and an elaboration of the properties and property settings of the customer group field 411 is provided, enabling and facilitating the user's ability to define and specify the elements of the report dataset metamodel to be generated. Customer group field 411 is illustratively depicted as having a field type property, which the user has selected and set to an option for grouping, and a grouping type property, which the user has selected and set to an option for category. Customer group field 411 is further illustratively depicted as having an aggregation field property, set by default to an option for "none"; an alias property, set by default to a customer group option; a caption property, set by default to an option for customer group; a data type property, set by default to a system string option; a display width property, set by default to an option for 1.5 inches; a format string property, which is not currently set to any option; a name property, currently set by default to an option for the name "Customer_Group"; and a parent grouping property, which is not currently set to any option, in the illustrative depiction of FIG. 4. The details of this illustration are not limiting, and could be in a wide variety of other arrangements of properties and setting options, for any of a variety of dataset fields, and with any property or combination of properties selected and set to a certain option by a user, or occupying any of a variety of default settings or no setting, which may be different in each case to those illustratively depicted in FIG. 4.

Figure 5:
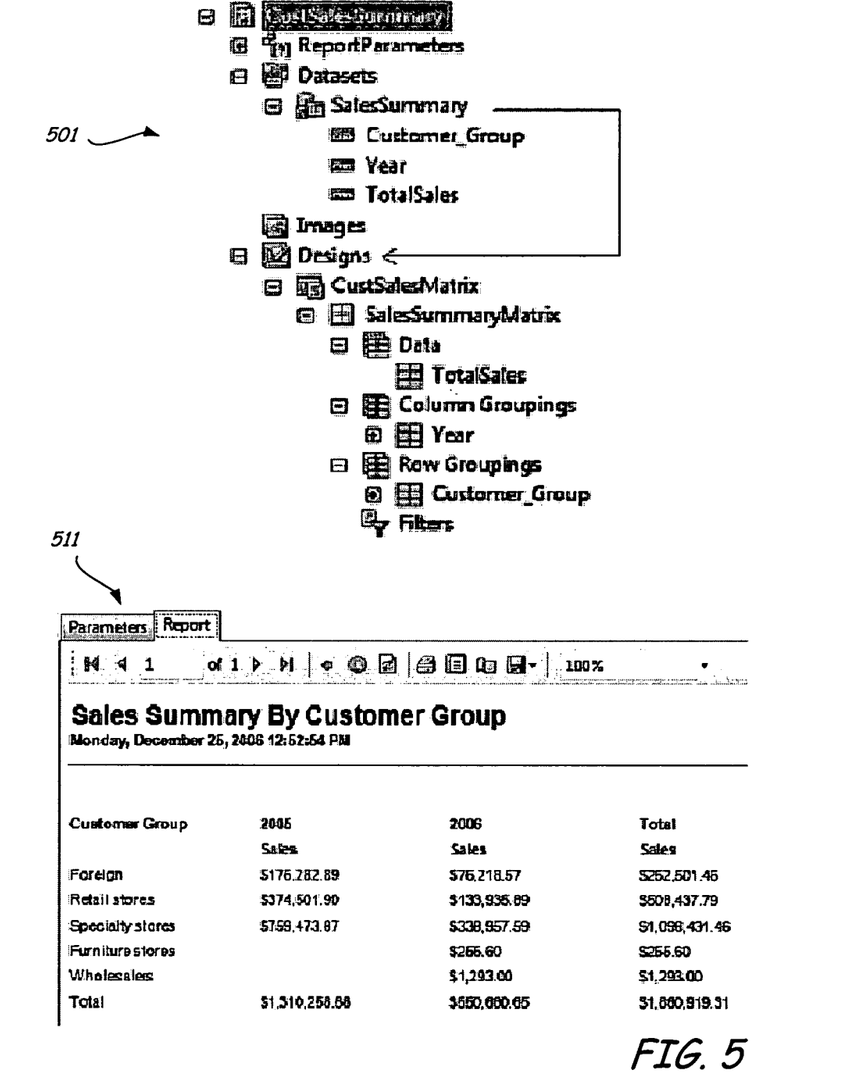
FIG. 5 depicts a screenshot of an implementation of a metamodel-based automates report generation system, and an automatically generated report, according to an illustrative embodiment.

FIG. 5 depicts a screenshot element of a more elaborated customer sales summary report dataset metamodel 501, as an object in an integrated development environment (IDE), along with a screenshot element of a previewed design of automatically generated report 511, according to one illustrative embodiment. A user may want to render the sales summary data in a cross-tab matrix layout, as an illustrative example. The user may select "matrix" as the value setting for the default layout property of the report, dataset, and associate the sales summary dataset with the designs collection of the customer sales summary report dataset metamodel 501. For example, this may be accomplished in the IDE provided for report dataset metamodel 501 by dragging the "sales summary" icon, which represents the sales summary dataset, and dropping it onto the "designs" icon, which represents the designs collection of the customer sales summary report dataset metamodel 501, in this illustrative embodiment. The drop event may trigger the design time automatic report generator 15, as in FIG. 1, which may use the report dataset metadata to automatically generate a cross-tab matrix design to render the sales summary data.

FIG. 5 depicts a preview the user can view of the report design of automatically generated report 511, that results from the drag and drop action depicted for the customer sales summary report dataset metamodel 501. Automatically generated report 511 including a cross-tab matrix report that renders a summary of sales by customer group and year, as illustratively depicted in FIG. 5. The automatic reporting property settings defined for the report dataset may be applied to group, layout, and format the data, in this illustrative embodiment.

Figure 6:
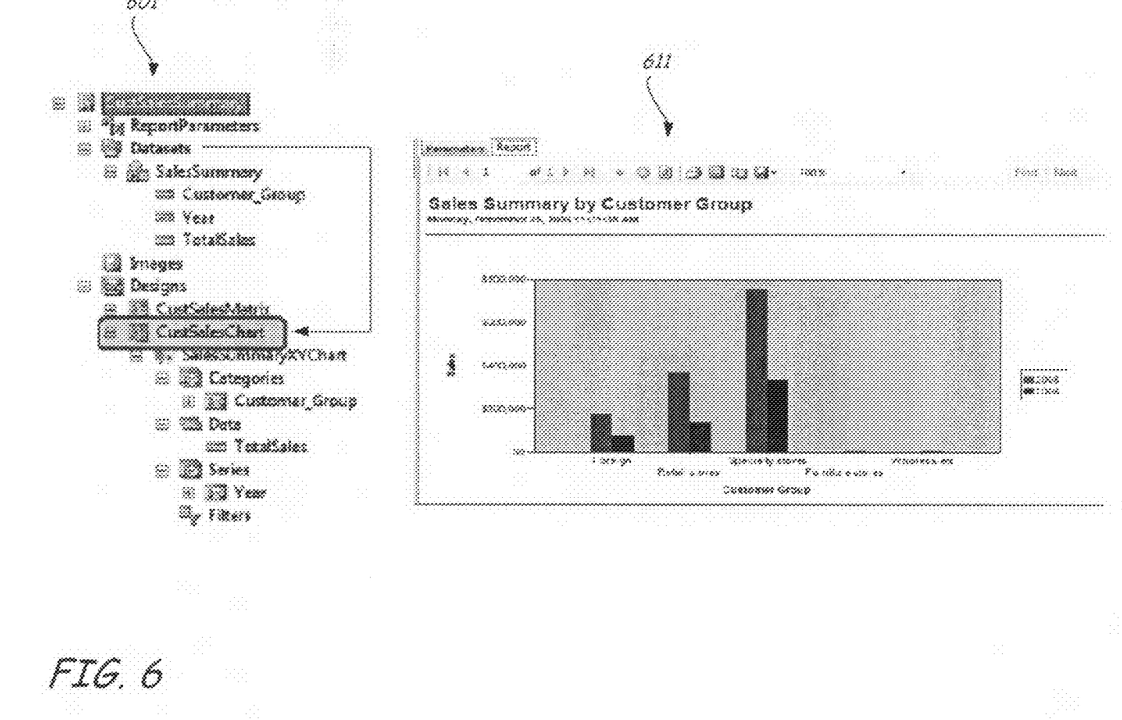
FIG. 6 depicts another screenshot of an implementation of a metamodel-based automatic report generation system, and an automatically generated report, according to an illustrative embodiment.

FIG. 6 depicts another screenshot of an implementation of a metamodel-based automatic report generation system, that enables the assembly and generation of customer sales summary report dataset metamodel 601. FIG. 6 also depicts a preview of a report design for an automatically generated report 611, according to an illustrative embodiment. A user may also want to create a visual column chart representation of the sales summary data seen in the matrix report above. To do this, the user may change the default layout property of the report dataset to a column chart layout property, and then associate the dataset, with this column chart layout property, on the report's designs collection, such as by dragging and dropping the dataset icon onto the designs icon, to generate a second design. The design time automatic report generator 15, as in FIG. 1, may recognize the change in the default layout property setting, and automatically generate a column chart design to render the data, as depicted in the illustrative embodiment of FIG. 6. Other embodiments may include a broad variety of other implementation aspects.

The preview of the report design of automatically generated report 611, as depicted as a screenshot element in FIG. 6, demonstrates a column chart rendering of the sales summary data. The automatic reporting property settings defined for the report dataset are applied to group, layout and format the data in accordance with the column chart layout type, in this illustrative embodiment. Other embodiments may feature a broad variety of other layout types, such as a bar chart, a pie chart, a doughnut chart, and other options.

Figure 7:
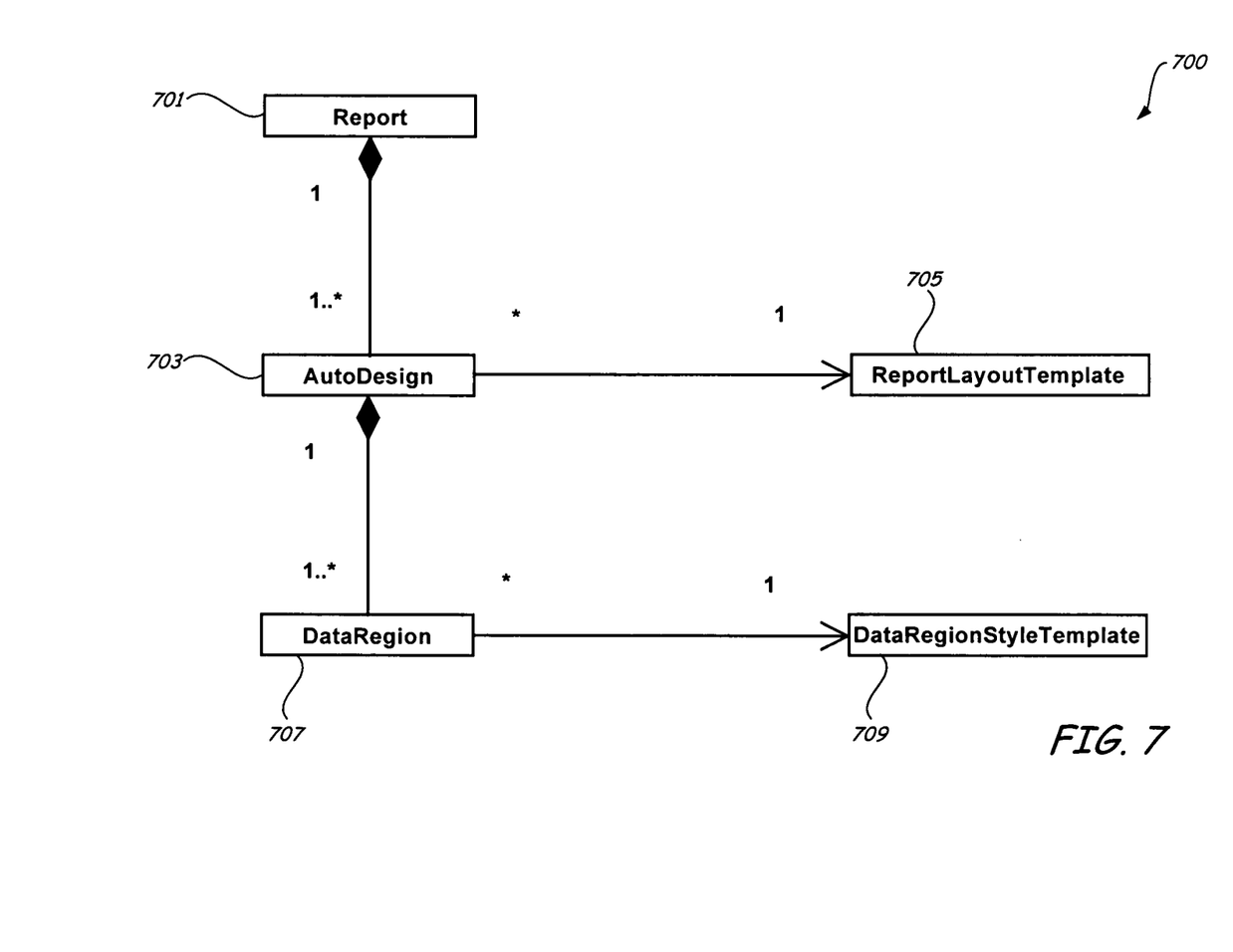
FIG. 7 depicts a class diagram of report style template definition metamodels for automatic report generation, according to an illustrative embodiment.

FIG. 7 depicts a class diagram of report style template definition metamodels for automatic report generation, according to an illustrative embodiment. A report dataset metamodel 701 can be associated with any number of automatic report designs 703, each of which in turn can be associated with a layout style template 705. Each of the automatic report designs 703 may also be associated with any number of individual data regions 707, each of which in turn can be associated with data region specific style templates 709. Illustrative examples of data region specific style templates 709 that may be available include table style templates, matrix style templates, chart style templates, and list style templates. Other data region style templates 709 are not limited to these illustrative examples, and may take a wide variety of other forms. In accordance with one embodiment, report style templates are first class metamodel types in reporting framework, that constitute abstracted objects, and include styling properties whose settings can be applied to style the presentation of data in automatic reports. Report layout templates 705 and report data region style templates 709 constitute two illustrative types of report style template metamodels, the generation of which may be enabled with report dataset metamodel 701 as depicted in the illustrative embodiment of FIG. 7. Other embodiments are not limited to the particular details provided in connection with FIG. 7, but may implement various other forms of report style template metamodels, for example.

The report style template metamodel types and properties are not limited to functioning with any specific report writer application. A default implementation for automatically generating report metamodels may map the styling metadata to styling elements in any language or schema, including as needed to interface with specialized end-stage report writing tools and applications that may use automatically generated report metamodels in enabling the creation of finalized reports, according to some embodiments. For example, an independent software vendor (ISV) could easily choose to implement custom style generators that materialize the styling metadata from report layout templates 705 and/or data region style templates 709, in various report styling schemas. Report style templates such as report layout templates 705 and/or data region style templates 709 provide advantages such as the ability to abstract report styling metadata and rendering from report data rendering, consistent report styling, and enabling styling changes to be defined once and propagated to all referencing reports, in a variety of embodiments.

Report layout templates 705 may be used to define the layout and styling of various separate sections into which an automatic report may be sectioned—for example, a page header, a page body and a page footer, in one illustrative embodiment. For example, a report layout template 705 can be defined to specify that a report title and a company name should appear in the page header, and that a page number, an execution date & time, and a user identifier of a user executing the report should be rendered in the page footer, in one illustrative embodiment. A report layout template 705 may also be used to define fonts and colors that may be used to render various items in the page header, body, and/or footer. Attributes that may also be specified for the report body, for example, may include a background color, a transparency setting, and a border styling, or any combination thereof, in different embodiments.

Report data region style templates 709 may be used to define styling attributes for individual data regions rendered in the body of an automatic report, for example. Supported data regions that may have style attributes thus defined by one or more data region style templates 709 may include tables, lists, matrices charts, and a broad variety of other data regions, in different embodiments.

In an illustrative scenario, various automatically generated reports may be provided with a variety of different style templates, according to an illustrative embodiment. For example, a user may want to change the styling of matrix data regions in an automatic report, to define color schemes for the row and column grouping sections and the data section. The user may edit a matrix style template associated with automatic matrix data regions in various automatic reports in an application model, to define a desired color scheme. The user may define a selected set of color settings as provided in Table 2 as follows:

TABLE 2

| Color | Data Region |
|---|---|
| Silver | Level 1 Row and Column Groupings |
| Gainsboro (light gray) | Level 2 Row and Column Groupings |
| LightSteelBlue | Data |

The user may preview a sales summary by customer group automatic matrix report, as earlier depicted in FIG. 5, and find the newly defined color scheme in effect. Referring to FIG. 5, although these colors are not depicted in the figures, the colors indicated in Table 2 may be provided in the respective fields of screenshot 500, so that the respective data regions are now colored medium gray, light gray, and light blue, respectively.

Figure 8:
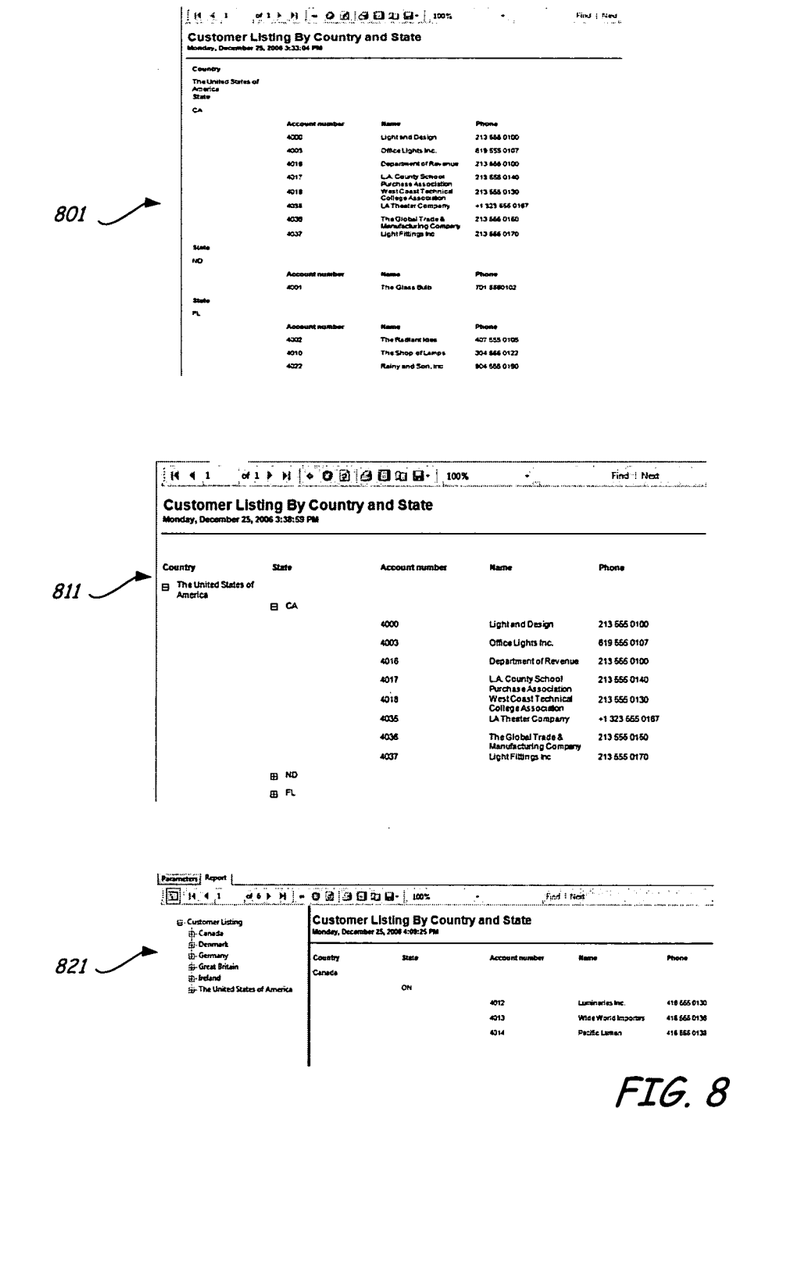
FIG. 8 depicts a screenshot of various automatically generated reports, according to additional illustrative embodiments.

FIG. 8 depicts screenshot elements of various automatically generated reports, according to different illustrative embodiments. In an illustrative sample scenario, a user may want to define an automatic tabular report. In this illustrative example, a user may define a report dataset to render a listing of customers. The dataset may illustratively include fields for Country, State, Customer Account Number, Customer Name, and Telephone. These examples are not limiting, and a wide variety of other fields may be used in other embodiments. In this illustrative embodiment, the user may mark the Country and State fields as grouping fields and select Table as the default layout setting of the dataset to create an automatic tabular customer listing report. The user may then drag and drop the dataset on the report's designs collection, as in FIGS. 5 and 6, above, to create the desired automatic tabular report. An automatic report with the specified tabular layout may then be rendered in a preview as in screenshot element 801 of FIG. 8.

A user may then notice that the customers are grouped by country and by states within the country. The user might however want the grouping levels to be indented. The user may then therefore set an Indent Groupings property of the automatic table data region to "true". The rendering of the preview of the automatic report may then automatically be updated, such that the column for the states or provinces is now indented under the country in which they are comprised, in this illustrative embodiment. The user may then also want the field captions to be rendered in a single file instead of being grouped. To do this, the user may selects a Single File value option for a Field Caption Rendering property of the automatic table data region, and this layout change may also then be automatically implemented. Next, the user may want to enable drill-down and drill-up navigation across the grouping and data levels. To do this the user may select a Drill Down value option as the setting for a Data Navigation Property of the automatic table data region, and this layout change may also automatically be implemented. The preview of the automatic report may then show that the user is now able to interactively and selectively drill down and up the grouping and data sections of the report. This, along with the prior two layout changes, are depicted in screenshot element 811 of FIG. 8.

The user may then want to render the report with a document map layout element. To do this, the user may select a document map value option as the setting for the data navigation property of the automatic table data region. The preview of the report may then also automatically render an interactive document map in the left pane, that enables a user to drill down and up the various grouping levels and instances, as shown with the country listing in the left pane in screenshot element 821 in FIG. 8.

This illustrative sample scenario therefore illustrates how common report rendering requirements can be addressed in a framework for automatically generating report metamodels, in accordance with one illustrative embodiment, such as by declaratively defining simple property settings in the report metadata, and other aspects such as those provided above. Achieving similar rendering requirements using a specialized report writer tool would, in contrast, involve making cumbersome layout changes to the report design, all of which may instead be handled prescriptively by a metamodel based automatic report processor.

A runtime framework for automatically generating report metamodels may similarly enable additional automatic report metamodels to be generated by a user at run time, to render data returned by dynamically constructed report datasets. This may, for example, enable functional scenarios such as generating automatic reports for queries constructed in an embedded end user query designer, to print query results; printing a form based on an automatically generated report; and generating automatic reports to render data returned by queries constructed dynamically in application logic, as a few illustrative examples. This automatic report generation may be exposed to the user through an automatic report generator class that comprises a public application protocol interface (API) to generate automatic report metamodels, for example. Other implementations are not limited to these examples, but may encompass a broad variety of other embodiments.

Figure 9:
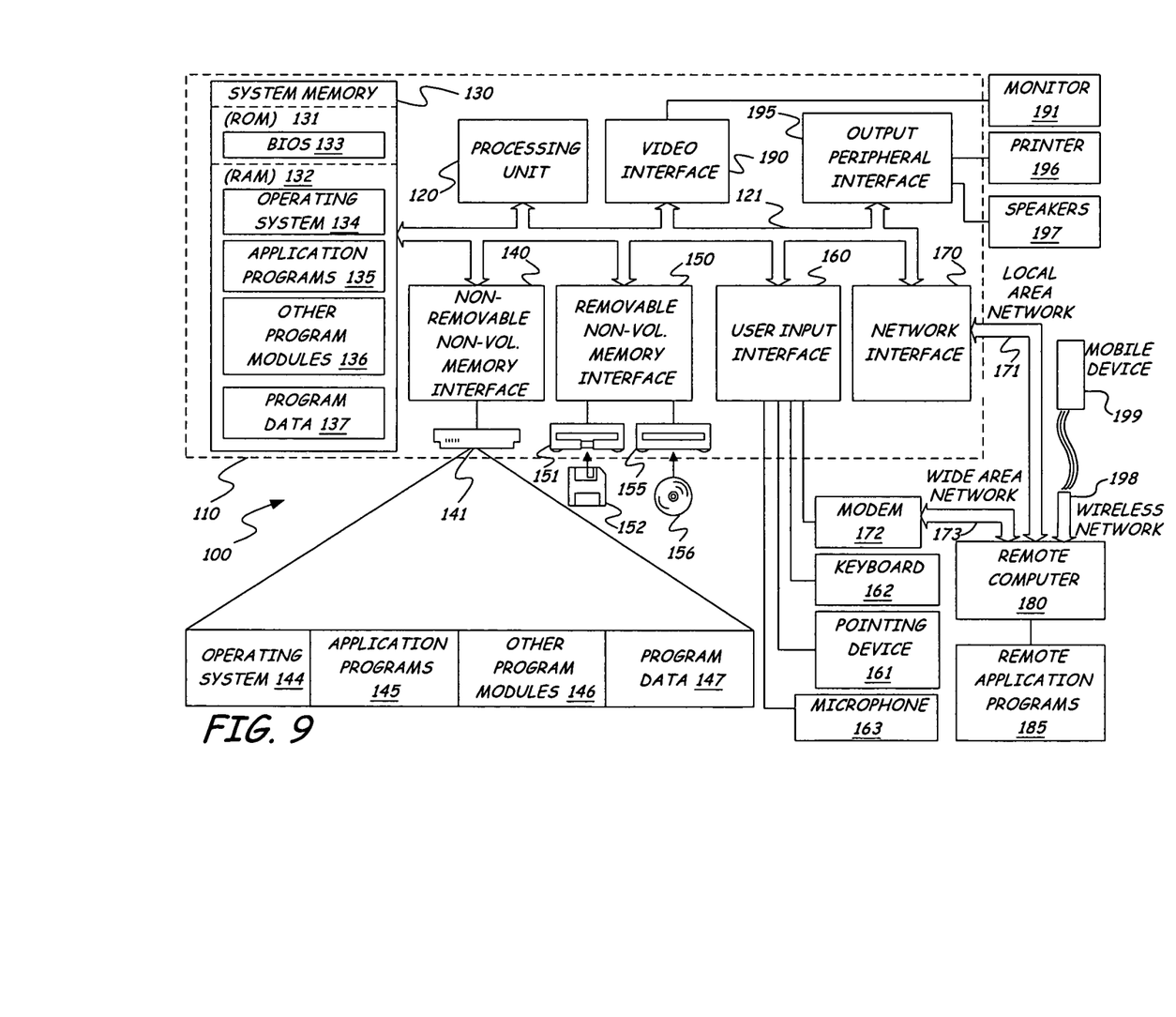
FIG. 9 depicts a block diagram of a computing environment in which some embodiments may be implemented.

FIG. 9 illustrates an example of a suitable computing system environment 100 on which various embodiments may be implemented. For example, various embodiments may be implemented as software applications, modules, or other forms of instructions that are executable by computing system environment 100 and that configure computing system environment 100 to perform various tasks or methods involved in different embodiments. A software application or module embodying a collocation error proofing embodiment may be developed in any of a variety of programming or scripting languages or environments. For example, it may be written using X++, SQL, TSQL, C#, F#, C++, C, Pascal, Visual Basic, Java, JavaScript, Delphi, Eiffel, Nemerle, Perl, PHP, Python, Ruby, Visual FoxPro, Lua, variations thereof, or any other programming language or combination of languages. It is also envisioned that new programming languages and other forms of creating executable instructions will continue to be developed, in which further embodiments may readily be developed.

According to one illustrative embodiment, computing system environment 100 may be configured to perform collocation error proofing tasks in response to receiving an indication of a word collocation in a text. Computing system environment 100 may then perform a Web search for each of one or more query templates associated with the indicated word collocation. Various query templates used may include a sentence, a reduced sentence, a chunk pair, and/or an individual word pair, any of which may include the word collocation. Computing system environment 100 may then evaluate whether results of the Web search for each of the query templates indicates that the word collocation corresponds to normal usage, or whether it is disfavored or indicative of likely error. Normal usage may be indicated by either an exact match of the query template comprising the sentence, or a matching score that is larger than a preselected threshold. The system may then indicate, as part of the output of computing system environment 100 via a user-perceptible output device as a result of an embodiment of a collocation error proofing method, whether the word collocation corresponds to normal usage, or is disfavored and is indicated to be erroneous usage.

Computing system environment 100 as depicted in FIG. 9 is only one example of a suitable computing environment for executing and providing output from various embodiments, and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices. As described herein, such executable instructions may be stored on a medium such that they are capable of being read and executed by one or more components of a computing system, thereby configuring the computing system with new capabilities.

With reference to FIG. 9, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 9 illustrates operating system 134, application programs 135, other program modules 136, and program data 137.

The computer 110 may also include other removable/non-removable volatile/nonvolatile computer storage media. By way of example and not limitation, FIG. 9 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 9, provide storage of computer readable instructions, data structures, program modules and other data for the computer 110. In FIG. 9, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 9 include a local area network (LAN) 171 and a wide area network (WAN) 173, and may also include other networks. Such networking environments are commonplace in offices, enterprise-wide computer networks, intranets and the Internet.

When used in a LAN networking environment, the computer 110 may be connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 9 illustrates remote application programs 185 as residing on remote computer 180. It will be appreciated that the network connections shown are exemplary and other means of establishing a communications link between the computers may be used.

The logical connections used by remote computer 180 also include a wireless network 198, which connect it to a mobile device 199, which may therefore also be in connection with computer 110 or other computers communicatively connected to the above logical connections. Mobile device 199 may constitute a mobile computing device that may also include a medium, readable by the mobile computing device, comprising executable instructions that are executable by the mobile computing device, according to another illustrative embodiment. Mobile device 199 may illustratively include a microprocessor, memory, input/output (I/O) components, and a communication interface for communicating with remote computers or other mobile devices. Mobile device 199 may also include any or all of the components depicted and described as comprised in computer 110, or analogous components directed more particularly to a mobile computing environment. Computing device 199 is enabled to make use of executable instructions stored on the media of its memory component, such as executable instructions that enable computing device 199 to perform tasks such as automatically to generate metamodel-based reports and related tasks, in a variety of illustrative embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. As a particular example, while the terms "computer", "computing device", or "computing system" may herein sometimes be used alone for convenience, it is well understood that each of these could refer to any computing device, computing system, computing environment, mobile device, or other information processing component or context, and is not limited to any individual interpretation. As another particular example, while many embodiments are presented with illustrative elements that are widely familiar at the time of filing the patent application, it is envisioned that many new innovations in computing technology will affect elements of different embodiments, in such aspects as user interfaces, user input methods, computing environments, and computing methods, and that the elements defined by the claims may be embodied according to these and other innovative advances while still remaining consistent with and encompassed by the elements defined by the claims herein.

What is claimed is:

1. A method, implemented by a computing system, the method comprising:
    displaying, on a graphical user interface display, a set of dataset icons, each dataset icon corresponding to a different dataset;
    displaying, on the graphical user interface display, a set of design icons, each design icon corresponding to a different report design;
    generating a report dataset metamodel by receiving a drag and drop input, on the graphical user interface display, visually associating a given dataset icon with a given design icon, the report dataset metamodel representing a given report layout type design that results from applying the report design corresponding to the given design icon to the dataset corresponding to the given dataset icon;
    automatically applying style properties, from a report style template metamodel associated with the report design corresponding to the given design icon, to the given report layout design represented by the report dataset metamodel, to obtain a report metamodel that includes an abstract definition of a production report;
    processing the report metamodel into a physical report definition schema; and
    displaying the production report based on the physical report definition schema.

2. The method of claim 1, wherein the report metamodel is automatically generated at design time for the report design.

3. The method of claim 1, wherein the report dataset metamodel incorporates data from at least one report query implementation selected from among the group consisting of: modeled queries, native database queries, native database stored procedures, and imperative application business logic.

4. The method of claim 1, further comprising generating the report dataset metamodel based on a query made in a relational database management system, and on the data returned by the query.

5. The method of claim 1, further comprising providing a representation of elements of the report dataset metamodel in an integrated development environment.

6. The method of claim 1, further comprising providing one or more options for a layout associated with the report dataset metamodel.

7. The method of claim 6, wherein the one or more options for the layout comprise at least one option from a group consisting of: table, matrix, list, column chart, bar chart, line chart, pie chart, and doughnut chart.

8. The method of claim 1, further comprising enabling the definition of one or more data fields selected from a group consisting of: customer name, customer account number, customer contact information, customer location, partner name, partner account number, partner contact information, partner location, supplier name, supplier account number, supplier contact information, supplier location, service provider name, service provider account number, service provider contact information, service provider location, units of time, type of transactions, value of transaction.

9. The method of claim 1, further comprising enabling the definition of one or more properties for one or more data fields, and one or more property setting options associated with at least one of the one or more properties.

10. The method of claim 9, wherein the one or more properties comprise at least one property selected from among the group consisting of: type of data, format string, alias, field type, aggregation function, grouping type, and caption.

11. The method of claim 10, wherein the property setting options associated with the field type property comprise at least one of a data option and a grouping option.

12. The method of claim 10, wherein the property setting options associated with the grouping type property comprise at least one of a category option and a series option.

13. The method of claim 9, further comprising providing a representation of the properties and the property setting options in an integrated development environment.

14. The method of claim 9, further comprising providing a preview of the report design based on a then-current definition of the one or more properties and the one or more property setting options.

15. The method of claim 1, further comprising enabling the report style template metamodel to be generated for one or more report layout templates and one or more data region style templates.

16. The method of claim 15, wherein the one or more report layout templates and one or more data region style templates comprise at least one property selected from among a group consisting of: color scheme, grouping indentation, file caption rendering, and data navigation.

17. The method of claim 1, further comprising enabling a report style schema to be selected, and enabling the report style template metamodel to be mapped to the selected report style schema.

18. A hardware computer storage memory storing computer executable instructions which, when executed by a computer system, cause the computing system to perform a method comprising:
    displaying, on a graphical user interface display, a set of dataset icons, each dataset icon corresponding to a different dataset;

displaying, on the graphical user interface display, a set of design icons, each design icon corresponding to a different report design;

generating a report dataset metamodel by receiving a drag and drop input, on the graphical user interface display, visually associating a given dataset icon with a given design icon, the report dataset metamodel representing a given report layout type design that results from applying the report design corresponding to the given design icon to the dataset corresponding to the given dataset icon;

automatically applying style properties, from a report style template metamodel associated with the report design corresponding to the given design icon, to the given report layout design represented by the report dataset metamodel, to obtain a report metamodel that includes an abstract definition of a production report;

processing the report metamodel into a physical report definition schema; and displaying the production report based on the physical report definition schema.

\* \* \* \* \*